S. P. HEDGES.
Fish-Scrap Elevator.

No. 220,376. Patented Oct. 7, 1879.

WITNESSES:
Henry N. Miller
C. Sedgwick

INVENTOR:
S. P. Hedges
BY Munn & Co
ATTORNEYS.

S. P. HEDGES.
Fish-Scrap Elevator.
No. 220,376. Patented Oct. 7, 1879.
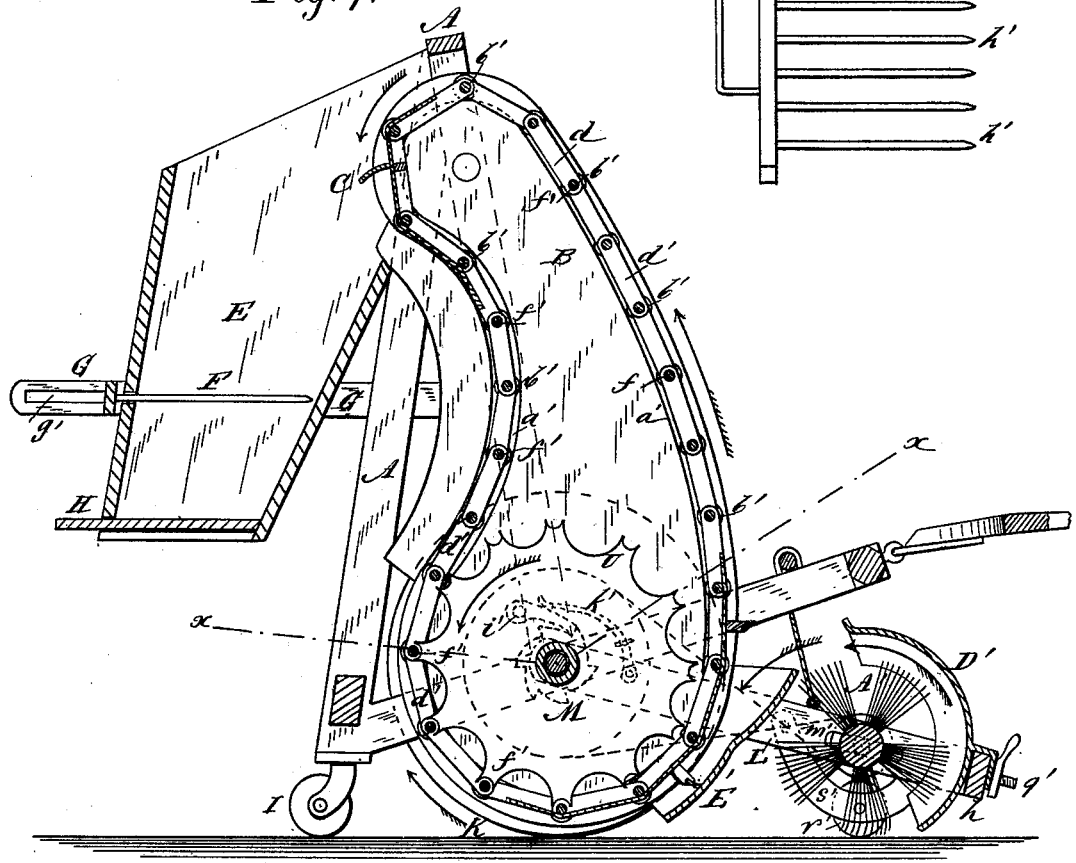

3 Sheets—Sheet 3

S. P. HEDGES.
Fish-Scrap Elevator.

No. 220,376. Patented Oct. 7, 1879.

WITNESSES:
C. Neveux
C. Sedgwick

INVENTOR:
S. P. Hedges
BY Munn & Co
ATTORNEYS.

UNITED STATES PATENT OFFICE.

SAMUEL P. HEDGES, OF GREENPORT, NEW YORK.

IMPROVEMENT IN FISH-SCRAP ELEVATORS.

Specification forming part of Letters Patent No. 220,376, dated October 7, 1879; application filed August 28, 1879.

*To all whom it may concern:*

Be it known that I, SAMUEL P. HEDGES, of Greenport, in the county of Suffolk and State of New York, have invented a new and Improved Fish-Scrap Elevator, of which the following is a specification.

Figure 1:
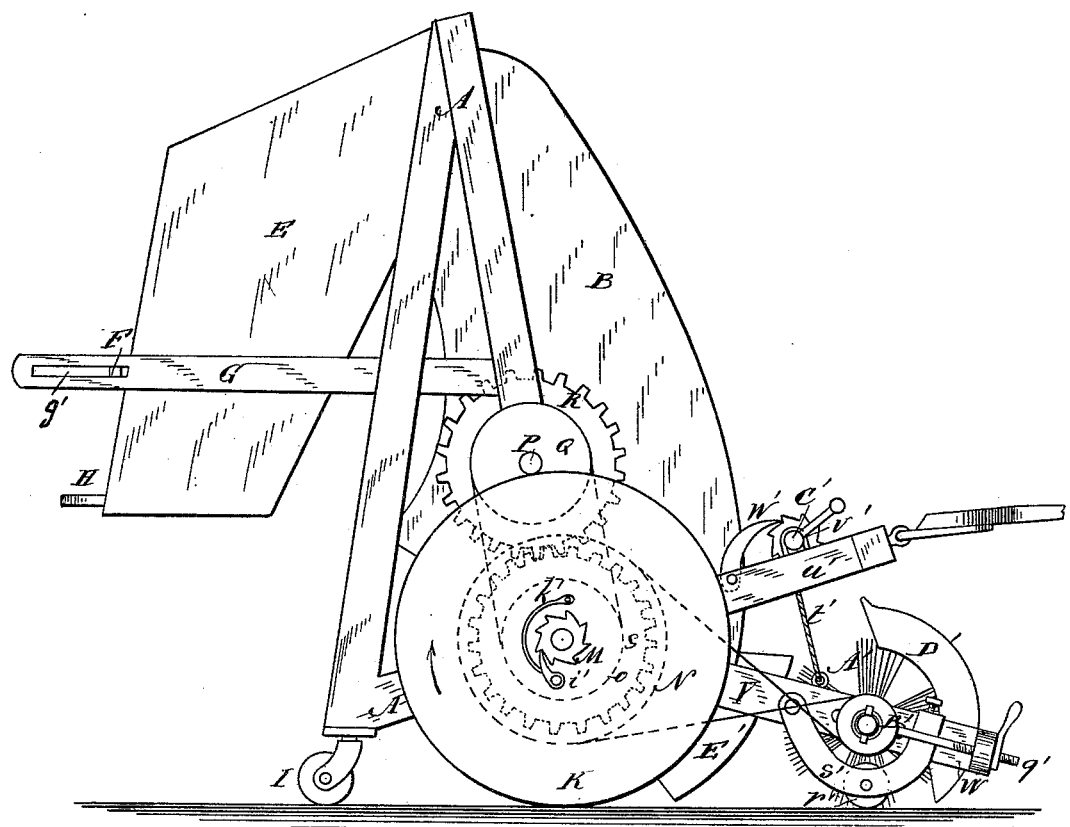
Figure 3:
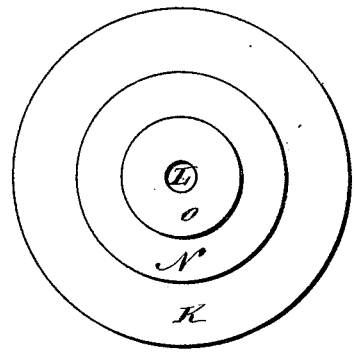
Figure 2:
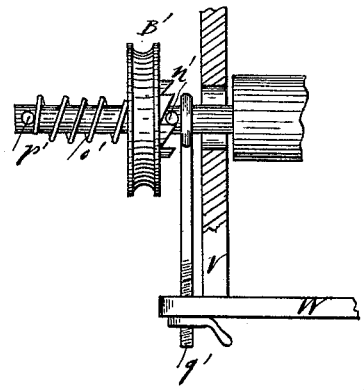
Figure 6:
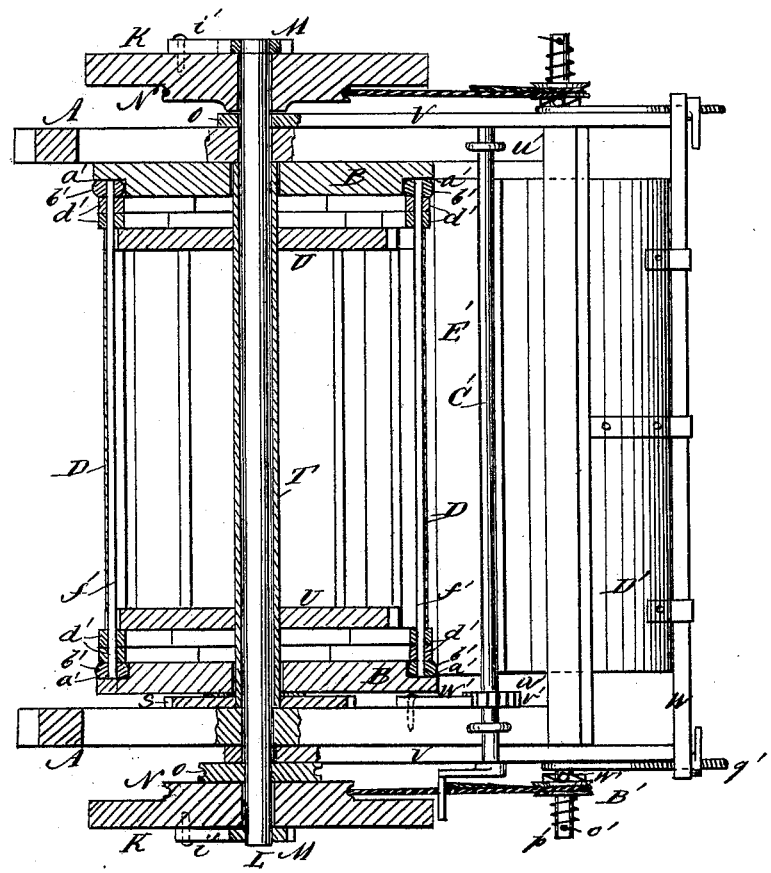
Figure 7:
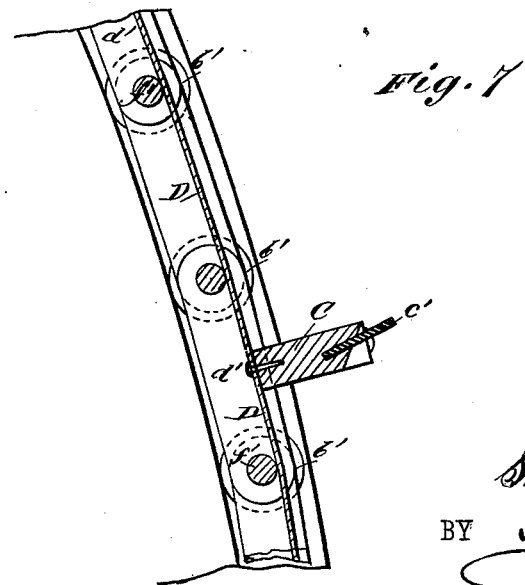

Figure 1 is a side elevation of the device. Fig. 2 is a plan, showing a portion of the driving and adjusting gear of the revolving brush. Fig. 3 is an elevation, showing the driving-pulley of the elevator-buckets, one of the driving-pulleys of the brush, and one of the wheels of the device as arranged upon one end of the main shaft. Fig. 4 is a vertical sectional elevation of the device. Fig. 5 is a plan of the hopper-gage or cut-off. Fig. 6 is a sectional plan on line $x\, x$, Fig. 4. Fig. 7 is a vertical side elevation, showing the apron-bucket with elastic edge and other parts of the device.

Similar letters of reference indicate corresponding parts.

The object of this invention is to provide a device for gathering and elevating fish-scrap and the like from drying-platforms, and discharging it into wagons or other receptacles.

The invention consists, essentially, of an upright frame supported on wheels, and carrying a bucket-elevator, to which motion is imparted by the action of the driving-wheels, by which the fish-scrap, &c., is removed from the drying-platform, and elevated and delivered into an elevated hopper fixed on the back of the device, which hopper is provided with a device to gage and cut off at any time from the superincumbent mass a quantity of the material sufficient for a cart-load.

It further consists of peculiarly-designed buckets, and of an adjustable and removable broom that may be used to sweep the scrap, &c., from the platform into the buckets.

It further consists of a novel arrangement of gearing, &c., for continuing the motions of the elevator and broom while the apparatus is being turned, all of which will be hereinafter more fully described.

In the drawings, A represents the upright frame, to the inner faces of which are secured the vertical sides B B of the elevator, which sides B B are chambered or channeled on their inner faces, as at $a'\, a'$, for the accommodation of the side rollers, $b'\, b'$, of the endless chain of buckets C C.

These buckets C C are constructed of metal or wood, and their front edges are provided with projecting strips of rubber or other elastic material, $c'$, that they may more readily conform to the irregularities of the surface from which the scrap is to be removed, and more readily clean the scrap therefrom.

The buckets C C are preferably secured at their ends on the links $d'$ of the endless chain, and the links $d'\, d'$ are pivoted on the transverse rods $f'\, f'$, on whose extreme ends are the side rollers, $b'\, b'$.

Stretched under or behind the buckets C C, and over the rods $f'\, f'$, is an endless belt or apron, D, that serves as a back to the buckets C C, and retains the elevated scrap therein until it is discharged into the hopper E, that is fixed on the back of the frame A, and hangs downward to a convenient distance for discharging into a cart.

It will be observed that the rear channels, $a'\, a'$, are so fashioned that the moving buckets C C, after discharging their contents into the hopper E, are made to move inward, so as to clear the hopper-edge.

Half-way down or more the hopper E is provided with a cut-off, F, that consists of a toothed slide whose ends are guided in the slots $g'\, g'$ of the horizontal supports G G, and whose teeth $h'\, h'$ can be pushed in through corresponding holes in the back of the hopper E, to cut off and hold the material above them, while that below them discharges into a cart on the withdrawal of the slide H.

The apparatus is supported on pivoted wheels or casters at the rear, and on the wheels K K at the sides, the latter being loosely secured on the main axle L, but thrown into gear or made to operate, as the device is drawn along, by the engagement of the pawls $i'\, i'$, that are fixed on said wheels K K in the teeth of the ratchets M M, that are keyed on the axle L, the pawls $i'\, i'$ being held to the ratchets by the springs $k'\, k'$.

The driving-wheels N N of the revolving brush are either constructed as parts of the larger wheels or are secured thereto, and, running loosely on the axle L, are governed in their movements as the larger wheels K K are, while the driving-wheel O of the elevator-buckets C C is keyed on the axle L on the inside of the other two.

Journaled in one of the upright frame-timbers is the shaft P, carrying keyed on its outer end the pulley Q, and on the inner the cog-wheel R, which latter meshes into the cog-wheel S, that is fixed on the hollow shaft T, serving as a sleeve for the axle L, and upon which are also keyed the sprocket-wheels U U, whose peripheral points engage with the rods $f'f'$, and thus give motion to the buckets C C.

With ends engaging over the axle L, the carriers V V project horizontally forward from the sides B B of the elevator, and are connected at their outer ends by the transverse rod or brace W, the three together, V V and W, forming an adjustable frame for the brush or broom and its cover.

The axle of the broom A' projects at either end through horizontal slots $m'm'$ in the carriers V V, and carries near each end a loose clutch-pulley, B', whose teeth are made to engage with the pins $n'n'$, that are set in the axle by the spiral springs $o'o'$, that surround the ends of the axle, and are held in place by the pins $p'p'$.

By turning the nuts on the screw-rods $q'q'$, whose inner ends are loosely looped about the axle, the brush A' may be adjusted backward or forward, for the purpose of securing a proper tension to its driving-belt.

The frame-work holding the brush A' and cover rests on the small wheels $r'r'$, that are journaled in the depending curved braces $s's'$, and can be raised at will by means of the crank-rod C', to which each end of the frame is connected by a cord or rope, $t'$.

This crank-rod C' is journaled on projecting timbers $u'u'$, to which the tongue of the device is made fast, and is provided with ratchet-wheel $v'$, in which engages the pawl $w'$.

The cover D', secured upon the brace W, serves to prevent the dispersion of the scrap that is swept up by the broom A', and the shield E' serves as well for this purpose and to present the collected scrap conveniently to the moving buckets C C; also to form an apron on which the buckets C C raise the scrap from the platform.

As the apparatus is drawn along, its driving-wheels $k\,k$ revolve in the direction of the arrows, as shown in Figs. 1 and 4, while a belt or chain connecting the driving-wheels N N of the revolving brush A' with the clutch-pulleys B' B', whose teeth engage with the pins $n'\,n'$, causes the brush or broom A' to revolve in the direction shown by its arrows in Fig. 4, and throw the scrap into the shield E'. At the same time the driving-wheel O of the elevator-buckets C C transmits motion by a belt or chain, through the pulley Q and cog-wheel R, to the cog-wheel S, that is keyed on the hollow shaft T, and thus motion is given to the sprocket-wheels U U, whose points engage with the rods $f'f'$ and give proper motion to the elevator-buckets C C.

The engagement of loose driving-wheels, clutch-pulleys, ratchet, and pawls is such, it will be seen, that the elevator-bucket and the broom will continue to move in their proper directions even when the apparatus is being turned short around, so that there shall be no interruption to the work of removing the scrap.

The brush or broom may at any time be removed and its services dispensed with.

Having thus fully described my invention, I claim as new and desire to secure by Letters Patent—

1. In combination with the upright frame A, the sides B B, buckets C C, apron D, hopper E, cut-off F, wheels I' I', loose wheels K K and N N, axle L, ratchets M M, driving-wheel O, shaft P, pulley Q, cog-wheels R and S, hollow shaft T, and sprocket-wheels U U, constructed and arranged substantially as herein shown and described.

2. The chambered vertical sides of the elevator, substantially as herein shown and described.

3. In combination with the chambered sides B B, the rollers $b'b'$, links $d'd'$, rods $f'f'$, and buckets C C, provided with elastic strips $c'c'$, substantially as herein shown and described.

4. The buckets C C, provided with elastic strips $c\,c$ on their front edges, substantially as and for the purpose described.

5. The combination of buckets C C with apron D, substantially as herein set forth.

6. The hopper E, fixed on the back of the frame A, and provided with cut-off F and slide H, substantially as herein shown and described.

7. The cut-off F, provided with teeth $h'h'$, and guided in slots $g'g'$ of the horizontal supports G G, substantially as and for the purpose described.

8. The loose wheels K K and N N, in combination with ratchets M M, pawls $i'i'$, springs $k'k'$, and axle L, substantially as herein shown and described.

9. The combination of the axle L and hollow shaft T with the driving-wheel O, shaft P, pulley Q, cog-wheels R and S, sprocket-wheels U U, and rods $f'f'$, substantially as and for the purpose described.

10. The carriers V V and brace W, in combination with the broom A', provided with clutch-pulleys B' B', pins $n'n'$ and $p'p'$, springs $o'o'$, and screw-rods $q'q'$, substantially as herein shown and described.

11. The revolving brush or broom A' and cover D', in combination with the shield E' and elevator-buckets C C, substantially as herein shown and described.

12. The broom or brush A', clutch-pulleys B' B', crank-rod C', cover D', and shield E', constructed and arranged as herein shown and described, in combination with the wheels N N, ratchets M M, pawls $i'$ $i'$, and springs $k'$ $k'$, substantially as herein shown and described.

SAMUEL P. HEDGES.

Witnesses:
   THOMAS F. PRICE,
   SAMUEL T. PRESTON.